(12) United States Patent
Zarabadi

(10) Patent No.: US 7,194,376 B2
(45) Date of Patent: Mar. 20, 2007

(54) CIRCUIT AND METHOD OF PROCESSING MULTIPLE-AXIS SENSOR OUTPUT SIGNALS

(75) Inventor: Seyed R. Zarabadi, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 15 days.

(21) Appl. No.: 10/832,755

(22) Filed: Apr. 27, 2004

(65) Prior Publication Data

US 2005/0240374 A1  Oct. 27, 2005

(51) Int. Cl.
*G06F 15/00* (2006.01)
(52) U.S. Cl. ............................ 702/141; 702/127
(58) Field of Classification Search ............... 324/162; 73/1.37, 1.38, 504.03, 504.15, 514.01, 514.02, 73/514.03, 514.05, 514.09, 514.15, 514.16; 702/141, 127
See application file for complete search history.

(56) References Cited

U.S. PATENT DOCUMENTS

| | | | |
|---|---|---|---|
| 2,912,657 A | 11/1959 | Schaevitz | 336/30 |
| 2,916,279 A | 12/1959 | Stanton | 264/1 |
| 3,842,681 A * | 10/1974 | Mumme | 73/504.15 |
| 4,435,737 A | 3/1984 | Colton | 361/280 |
| 4,699,006 A | 10/1987 | Boxenhorn | 73/517 |
| 4,736,629 A | 4/1988 | Cole | 73/517 |
| 4,805,456 A | 2/1989 | Howe et al. | 73/517 |
| 4,851,080 A | 7/1989 | Howe et al. | 156/647 |
| 5,092,174 A | 3/1992 | Reidemeister et al. | 73/517 |
| 5,146,389 A | 9/1992 | Ristic et al. | 361/283 |
| 5,226,321 A | 7/1993 | Varnham et al. | 73/505 |

(Continued)

FOREIGN PATENT DOCUMENTS

SU  0583397  12/1977

(Continued)

OTHER PUBLICATIONS

"Rejecting Rotational Disturbances on Small Disk Drives Using Rotational Accelerometers" Daniel Y. Abramovitch, 1996, IFAC World Congress in San Francisco, CA 1996, pp. 1-6.

(Continued)

*Primary Examiner*—Michael Nghiem
*Assistant Examiner*—Douglas N. Washburn
(74) *Attorney, Agent, or Firm*—Jimmy L. Funke

(57) ABSTRACT

A dual-axis accelerometer and processing circuit are provided. The accelerometer has a plurality of fixed electrodes supported on a substrate and fixed capacitive plates arranged in first and second sensing axes. An inertial mass is suspended over a cavity and includes movable capacitive plates arranged to provide a capacitive couplings with the fixed capacitive plates. The inertial mass is movable relative to the plurality of fixed electrodes. The accelerometer has a plurality of support arms for supporting the inertial mass relative to the fixed electrodes and allowing movement of the inertial mass upon experiencing acceleration along the first and second sensing axes. The accelerometer further has inputs for receiving input signals and an output for providing an output signal which varies as a function of the capacitive coupling and is indicative of sensed acceleration. The processing circuit extracts the components of acceleration along the first and second sensing axes.

22 Claims, 11 Drawing Sheets

U.S. PATENT DOCUMENTS

| | | | |
|---|---|---|---|
| 5,233,213 A | 8/1993 | Marek | 257/415 |
| 5,249,465 A | 10/1993 | Bennett et al. | 73/510 |
| 5,251,484 A | 10/1993 | Mastache | 73/517 |
| 5,253,526 A | 10/1993 | Omura et al. | 73/517 |
| 5,310,450 A | 5/1994 | Offenberg et al. | 156/630 |
| 5,314,572 A | 5/1994 | Core et al. | 156/643 |
| 5,345,824 A * | 9/1994 | Sherman et al. | 73/514.18 |
| 5,349,858 A | 9/1994 | Yagi et al. | 73/517 |
| 5,388,460 A | 2/1995 | Sakurai et al. | 73/517 |
| 5,417,111 A | 5/1995 | Sherman et al. | 73/517 |
| 5,431,050 A | 7/1995 | Yamada | 73/517 |
| 5,481,914 A * | 1/1996 | Ward | 73/504.16 |
| 5,540,095 A | 7/1996 | Sherman et al. | 73/514 |
| 5,569,852 A | 10/1996 | Marek et al. | 73/514 |
| 5,578,755 A | 11/1996 | Offenberg | 73/514 |
| 5,665,915 A | 9/1997 | Kobayashi et al. | 73/514 |
| 5,707,077 A | 1/1998 | Yokota et al. | 280/735 |
| 5,731,520 A | 3/1998 | Stevenson et al. | 73/514 |
| 5,737,961 A * | 4/1998 | Hanisko et al. | 73/1.38 |
| 5,847,280 A | 12/1998 | Sherman et al. | 73/514 |
| 5,939,633 A * | 8/1999 | Judy | 73/514.32 |
| 6,000,287 A | 12/1999 | Menzel | 73/514 |
| 6,199,430 B1 | 3/2001 | Kano et al. | 73/514 |
| 6,257,062 B1 | 7/2001 | Rich | 73/514 |
| 6,428,713 B1 | 8/2002 | Christenson et al. | 216/2 |
| 6,508,124 B1 | 1/2003 | Zerbini et al. | 73/514 |

FOREIGN PATENT DOCUMENTS

| | | | |
|---|---|---|---|
| SU | 1035523 | 8/1983 | |
| SU | 1040424 | 9/1983 | 73/517 A |

OTHER PUBLICATIONS

"Increased Disturbance Rejection in Magnetic Disk Drives by Acceleration Feedforward Control and Parameter Adaption" M.T. White and M. Tomizuka, vol. 5, No. 6, 1997, pp. 741-751.

"Surface Micromachined Angular Accelerometer with Force Feedback" T.J. Brosnihan, A.P. Pisano and R.T. Howe, DSC-vol. 57-2, 1995, IMECE pp. 941-947.

* cited by examiner

CIRCUIT AND METHOD OF PROCESSING MULTIPLE-AXIS SENSOR OUTPUT SIGNALS

CROSS-REFERENCE TO RELATED APPLICATION

This application is one of two applications filed on the same date, both commonly assigned and having similar specifications and drawings, the other application being identified as U.S. application Ser. No. 10/832,666, entitled "DUAL-AXIS ACCELEROMETER."

TECHNICAL FIELD

The present invention generally relates to acceleration sensors (i.e., accelerometers) and, more particularly relates to a dual-axis capacitive type accelerometer and signal processing circuit.

BACKGROUND OF THE INVENTION

Accelerometer microsensors are commonly employed to measure the second derivative of displacement with respect to time. In particular, linear accelerometers measure linear acceleration along a particular sensing axis and generate an output signal (e.g., voltage) proportional to the linear acceleration. Linear accelerometers are employed for use in vehicle control systems to control safety-related devices on an automotive vehicle, such as frontal and side air bags. Additionally, low-g accelerometers are employed in automotive vehicles for active vehicle dynamics control and suspension control applications.

Conventional linear accelerometers typically employ an inertial mass suspended from a frame by multiple support beams. The inertial mass, support beams, and frame generally act as a spring mass system, such that the displacement of the inertial mass is proportional to the linear acceleration applied to the frame. The displacement of the mass generates a voltage proportional to linear acceleration, which is used as a measure of the linear acceleration.

Many microsensors are capacitive type sensing devices that employ a capacitive coupling between fixed and movable capacitive plates, in which the movable plates move in response to linear acceleration along a sensing axis. One example of a linear accelerometer microsensor is disclosed in U.S. Pat. No. 6,761,070, entitled "MICROFABRICATED LINEAR ACCELEROMETER," which is hereby incorporated herein by reference. The aforementioned linear accelerometer is generally fabricated by employing micro-electro-mechanical systems (MEMS) fabrication techniques, such as etching and micromachining processes. The linear accelerometer is configured such that the accelerometer detects acceleration in the direction of a single sensing axis.

Active vehicle control and safety systems employed onboard vehicles are becoming increasingly complex and sophisticated. The inclusion of both frontal and side air bags in a vehicle requires an increased number of axes along which acceleration must be sensed. With complex vehicle motions, it is desirable for such systems to employ acceleration sensing devices that can sense acceleration in multiple sensing axes, such as two orthogonal axes (e.g., longitudinal axis and lateral axis).

Conventional dual-axis acceleration sensing systems include the use of two individual single axis accelerometers positioned in close proximity to one another and oriented ninety degrees (90°) relative to each other. The first accelerometer senses acceleration in a first sensing axis and the second accelerometer senses acceleration in a second sensing axis orthogonal thereto. The use of two separate accelerometers requires duplicate components including two separate inertial masses and supporting structures and a large number of interconnects. Additionally, the conventional arrangement of two separate accelerometers exhibits poor mechanical cross axis sensitivity response due to the difference in the center of mass of the two separate inertial masses.

The conventional approach to achieving dual-axis linear acceleration sensing generally suffers from various drawbacks including separate duplicative components, large size, in addition to the inability of some sensing systems to detect acceleration at angles between the first and second sensing axes. It is therefore desirable to provide for a low-cost and compact accelerometer that senses acceleration in multiple sensing axes, and offers enhanced sensitivity that eliminates or reduces the drawbacks of prior known acceleration sensing techniques. It is further desirable to provide for a processing circuit and method of processing the sensor generated signals to extract the measured acceleration in multiple sensing axes.

SUMMARY OF THE INVENTION

In accordance with one aspect of the present invention, a dual-axis accelerometer is provided. The accelerometer includes a supporting substrate, a first fixed electrode supported on the substrate and including a first plurality of fixed capacitive plates, and a second fixed electrode supported on the substrate and including a second plurality of fixed capacitive plates. The first and second plurality of fixed capacitive plates are arranged in first and second sensing axes, respectively. The accelerometer also includes an inertial mass suspended over a cavity and including a first plurality of movable capacitive plates arranged to provide a capacitive coupling with the first plurality of fixed capacitive plates and a second plurality of movable capacitive plates arranged to provide a capacitive coupling with the second plurality of fixed capacitive plates. The inertial mass is movable relative to the first and second electrodes. The accelerometer has a plurality of support arms for supporting the inertial mass relative to the first and second electrodes and allowing movement of the inertial mass upon experiencing accelerations along the first and second sensing axes. The accelerometer further has an input for applying an input signal to the accelerometer and an output for providing an output signal which varies as a function of the capacitive coupling and is indicative of acceleration along the first and second sensing axes.

According to another aspect of the present invention, a signal processing circuit and method are provided for processing signals generated by a multiple-axis sensor. The circuit includes an input for receiving a sensor signal generated by a multiple-axis sensor. The circuit has a first demodulator for demodulating the sensor signal to generate a first signal indicative of a sensed parameter in a first sensing axis. The circuit also has a second demodulator for demodulating the sensor signal to generate a second signal indicative of a sensed parameter in a second sensing axis. The circuit further includes an output for providing the first and second signals.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
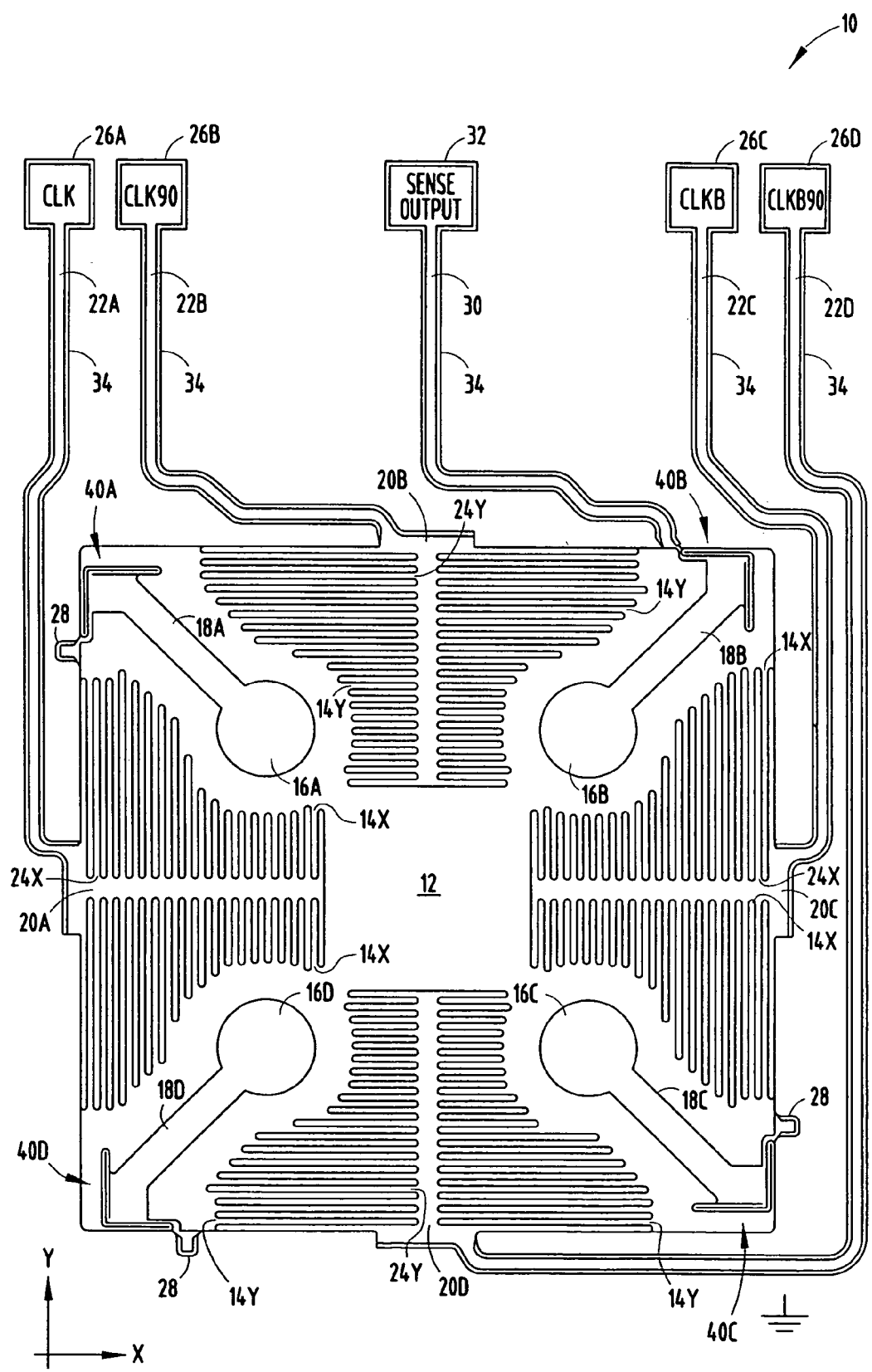
FIG. 1 is a top view of a dual-axis accelerometer according to a first embodiment of the present invention.
Figure 2:
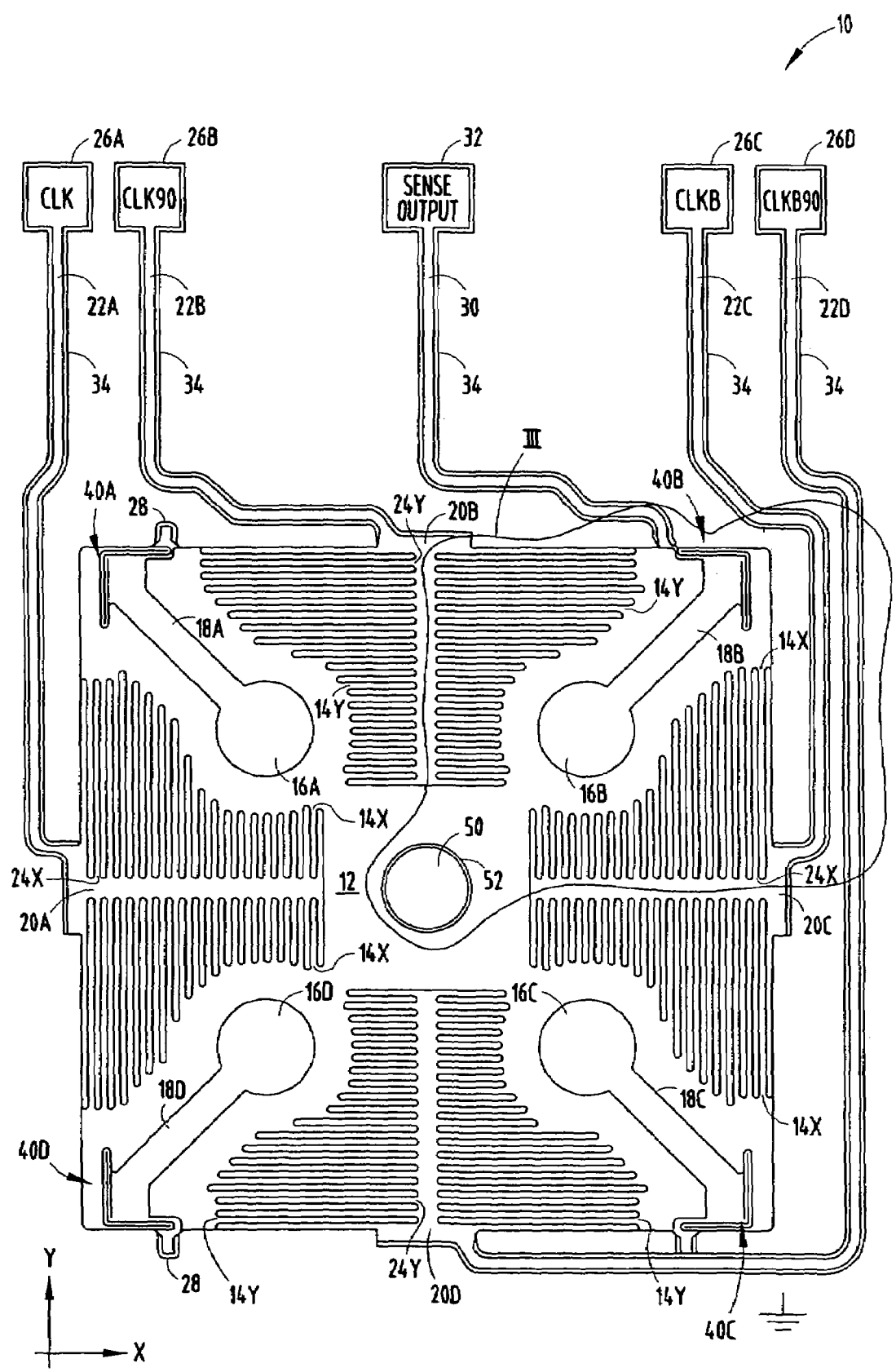
FIG. 2 is a top view of a dual-axis accelerometer according to a second embodiment of the present invention.
Figure 3:
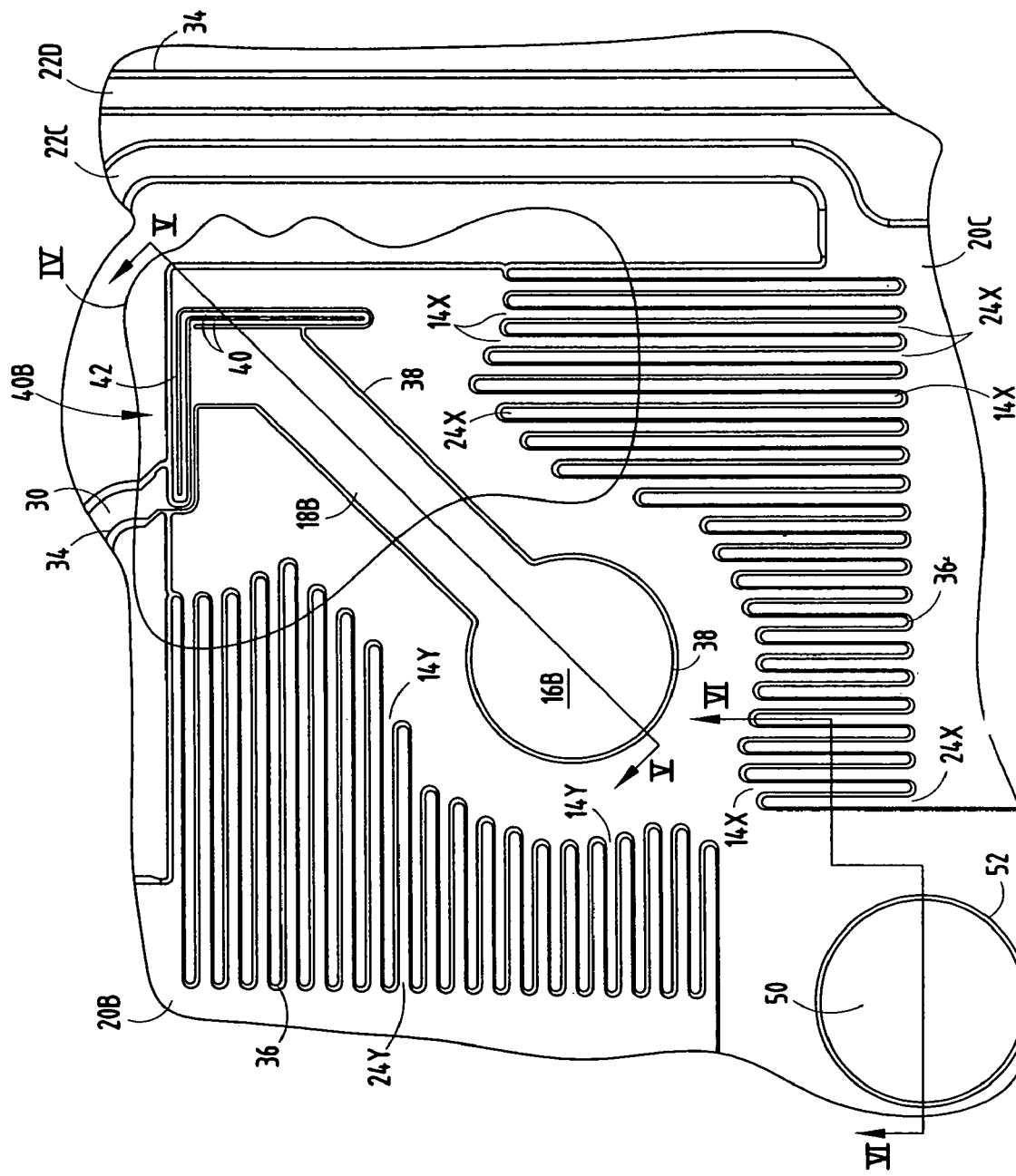
FIG. 3 is an enlarged view of section III taken from FIG. 2.

A dual-axis accelerometer 10 for sensing acceleration in both the X-axis and Y-axis is illustrated in FIGS. 1 and 2, according to first and second embodiments of the present invention. The accelerometer 10 is a dual-axis accelerometer capable of sensing complex linear acceleration along two orthogonal sensing axes, namely the X-axis and the Y-axis. The X- and Y-axes are oriented orthogonal (ninety degrees (90°)) relative to each other according to the embodiment shown. The accelerometer 10 senses the acceleration components along both the X- and Y-axes, and hence may sense linear acceleration in any direction within a plane defined by the X- and Y-axes. The dual-axis accelerometer 10 shown in FIG. 1 has a generally one-quarter symmetry according to a first embodiment, and the accelerometer 10 shown in FIG. 2 has a generally one-half symmetry and an isolated central portion according to a second embodiment.

The dual-axis accelerometer 10 is a micromachined microsensor having a supporting substrate, a plurality of fixed electrodes including a first plurality of fixed capacitive plates arranged in a first sensing axis (X-axis) and a second plurality of fixed capacitive plates arranged in a second sensing axis (Y-axis). The accelerometer 10 includes an inertial mass suspended over a cavity and including a plurality of movable capacitive plates arranged to provide a capacitive coupling with the first plurality of fixed capacitive plates and a second plurality of movable capacitive plates arranged to provide a capacitive coupling with the second plurality of fixed capacitive plates. The inertial mass is movable relative to the first and second electrodes. The accelerometer 10 also has a plurality of support arms for supporting the inertial mass relative to the first and second electrodes and allowing movement of the inertial mass upon experiencing accelerations along either of the first and second axes. The accelerometer 10 further includes inputs for applying input signals to the accelerometer, such as to the fixed electrodes, and an output for providing an output signal which varies as a function of the capacitive coupling and is indicative of acceleration along the first and second sensing axes. The output signal is processed via control circuitry to generate signals indicative of the acceleration sensed in each of the first and second sensing axes.

Referring to FIGS. 1–8, the fabrication of the dual-axis accelerometer 10 is shown on a single-crystal silicon supporting substrate 60 using a trench etching process, such as DRIE and bond-etch back process. The etching process may include etching out a pattern from a doped material suspended over a cavity 62 to form a conductive pattern that is partially suspended over the cavity 62. One example of an etching process that may be used to form the microsensor accelerometer 10 is disclosed in commonly assigned U.S. Pat. No. 6,428,713, issued on Aug. 6, 2002, and entitled "MEMS SENSOR STRUCTURE AND MICROFABRICATION PROCESS THEREFOR," which is hereby incorporated herein by reference. While the microsensor dual-axis accelerometer 10 described herein is fabricated on a single-crystal silicon substrate 60 using a trench etching process, it should be appreciated that the microsensor accelerometer 10 could be fabricated using other known fabrication techniques, such as: an etch and undercut process; a deposition, pattern, and etch process; and an etch and release process.

The accelerometer 10 includes an inertial mass 12 suspended over a cavity 62. The inertial mass 12 has a plurality of rigid comb-like conductive fingers (plates) 14X and 14Y extending in the X- and Y-sensing axes to serve as movable capacitive plates. The conductive plates include a first plurality of movable capacitive plates 14X formed along the Y-axis and perpendicular to the X-sensing axis. The conductive plates also include a second plurality of movable conductive plates 14Y formed along the X-axis and perpendicular to the Y-sensing axis.

The inertial mass 12 with comb-like conductive plates 14X and 14Y, is a movable seismic mass that is suspended over cavity 62 by four rigid support arms 18A–18D having four folded spring tethers 40A–40D which are formed to allow the inertial mass 12 to move in any direction within a plane defined by the X- and Y-axes when subjected to acceleration. For example, the inertial mass 12 may move in the X-axis or the Y-axis, or at any angle between the X- and Y-axes and within the plane defined by the X- and Y-axes. For purposes of discussion herein, the X-axis and Y-axis are defined as shown oriented in FIGS. 1 and 2.

The dual-axis accelerometer 10 shown in FIG. 1 has a main central portion having a substantially square shape and peripheral portions generally extending from the corner regions and containing the plurality of movable capacitive plates 14X and 14Y. The shape and size of the movable capacitive plates 14X and 14Y may vary, depending on the shape of the inertial mass 12. The overall size and shape of the inertial mass 12 and conductive plates 14X and 14Y may also vary.

The inertial mass 12 is shown generally suspended above cavity (air gap) 62 via a support assembly including four rigid support arms 18A–18D having four folded spring tethers 40A–40D. The four folded spring tethers 40A–40D are located substantially near the four corners of the accelerometer 10 and each includes a folded extension member 40 formed by etching trenches 42 on both sides thereof. Each folded extension member 40 is shaped in a folded pattern extending with folded portions in both the X-axis and the Y-axis so as to provide flexibility and allow movement in both the X- and Y-axes. Each folded extension member 40 is connected to the inertial mass 12 near a corner at one end, and is further extends from one of the rigid support arms 18A–18D at the other end. The rigid support arms 18A–18D, in turn, are fixed to the underlying substrate 60 via rigid support members 16A–16D and underlying pedestal 64. The rigid support arms 18A–18D, support members 16A–16B and folded spring tethers 40A–40D are formed as etched extensions from an EPI layer supported on top of the substrate 60.

The folded spring tethers 40A–40D are flexible beams that act as springs which are compliant to bending along both the sensing X-axis and sensing Y-axis, but are relatively stiff to bending in the direction which extends perpendicular to the plane formed by the X-axis and the Y-axis. The folded member 40 forming each of folded spring tethers 40A–40D may have a thickness (depth) in the range of three to two hundred micrometers and a width in the range of one to fifty micrometers. According to one example, folded member 40 may have a thickness of approximately thirty micrometers as compared to a width of approximately ten micrometers to provide a sufficient aspect ratio of thickness-to-width to allow for flexibility along both the X-axis and Y-axis and stiffness in the direction perpendicular to the plane formed by the X- and Y-axes.

The individual folded members 40 are formed by etching channels (trenches) 42 on opposite sides thereof. Additionally, a channel (trench) 38 is formed around each of the rigid support arms 18A–18D and rigid members 16A–16D so as to isolate the rigid members 16A–16D and rigid support members 18A–18D from the inertial mass 12. The channels 38 and 42 form air gaps which allow movement of the inertial mass 12 and moveable conductive plates 14X and 14Y relative to the rigid supporting structure and the fixed electrodes 20A–20D.

Fixed to substrate 60 are four fixed electrodes 20A–20D, each having a plurality of fixed comb-like capacitive plates 24X or 24Y interdisposed (interleaved) between adjacent moveable capacitive plates 14X and 14Y, to form four banks of variable capacitors. The first fixed electrode 20A has a clock input line 22A for receiving a clocked signal CLK (26A), such as a square wave signal. The plurality of fixed capacitive plates 24X provided with the first fixed electrode 20A are interdisposed between adjacent movable capacitive plates 14X of inertial mass 12 in one quadrant of inertial mass 12, to provide a first bank of capacitors. The plurality of fixed capacitive plates 24X are arranged along the Y-axis and are perpendicular to the sensing X-axis for sensing acceleration in the X-axis direction.

The second fixed electrode 20B has a plurality of fixed comb-like capacitive plates 24Y interdisposed between adjacent movable capacitive plates 14Y of inertial mass 12 in a second quadrant of inertial mass 12 to provide a second bank of capacitors. The fixed capacitive plates 24Y are oriented along the X-axis and perpendicular to the sensing Y-axis for sensing acceleration in the Y-sensing axis direction. The second fixed electrode 20B has a clock input 22B for receiving a second clocked signal CLK90 (28B), such as a square wave signal. The second clocked signal CLK90 is ninety degrees (90°) out of phase with the first input signal CLK, according to one embodiment.

The third fixed electrode 20C includes a plurality of fixed capacitive plates 24X interdisposed between adjacent movable capacitive plates 14X of inertial mass 12 in a third quadrant of inertial mass 12 to provide a third bank of capacitors. The fixed capacitive plates 24X in the third fixed electrode 20C are aligned in the Y-axis and perpendicular to the sensing X-axis for sensing acceleration in the X-axis direction. The third fixed electrode 20C has an input line 22C for receiving a clocked signal CLKB (26C). Clocked signal CLKB may be a square wave signal that is one hundred eighty degrees (180°) out of phase with input signal CLK.

The fourth fixed electrode 20D has a plurality of fixed capacitive plates 24Y interdisposed between adjacent movable capacitive plates 14Y of inertial mass 12 in a fourth quadrant of inertial mass 12 to provide a fourth bank of capacitors. The fixed capacitive plates 24Y of fourth fixed electrode 20D are aligned in the X-axis and perpendicular to the sensing Y-axis for sensing acceleration in the Y-axis direction. The fourth fixed electrode 20D has a clock input 22D for receiving a clocked signal CLKB90 (26D). According to one embodiment, CLKB90 is a square wave signal that is two hundred seventy degrees (270°) out of phase with clock signal CLK.

According to the embodiments shown, first and third fixed electrodes 20A and 20C receive clocked input signals CLK and CLKB that are one hundred eighty degrees (180°) out of phase with each other, and are used to sense acceleration along the X-axis. The second and fourth fixed electrodes 20B and 20D receive clocked input signals CLK90 and CLKB90 that are out of phase by ninety degrees (90°) and two hundred seventy degrees (270°), respectively, relative to clocked signal CLK, and are used to sense acceleration in the Y-axis. It should be appreciated that the number of fixed electrodes employed in the dual-axis accelerometer 10 could be one, two, or more.

Each of the fixed electrodes 20A–20D are formed radially inward from the outer perimeter of the inertial mass 12 and extend through an angular rotation of ninety degrees (90°) relative to adjacent electrodes. Adjacent fixed electrodes 20A–20D are dielectrically isolated from one another via isolators 28 and the sense output line 30 and its isolation channels 34. Each isolator 28 has one or more slots that serve to provide a dielectric air gap. The perimeter portions of fixed electrodes 20A–20D and corresponding plurality of fixed capacitive plates 24X and 24Y are fixed in place supported on top of a thick oxide insulation layer 58 formed on top of substrate 60. The fixed capacitive plates 24X and 24Y are cantilevered extending over cavity 62. Accordingly, the inertial mass 12 and its rigid outer peripheral movable capacitive plates 14X and 14Y are able to move relative to fixed capacitive plates 24X and 24Y, respectively, in response to linear acceleration experienced along either of the sensing X- and Y-axes.

The inertial mass 12 and movable capacitive plates 14X and 14Y are electrically conductive and are electrically coupled via an output line 30 to output pad 32 for providing a sensed output charge $V_O$. The output line 30 is formed by a trench etched channel 34 on opposite sides thereof to provide dielectric isolation to the signal line 30. The output charge $V_O$ is processed to generate a voltage signal indicative of displacement of the inertial mass 12 relative to the fixed electrodes 20A–20D due to linear acceleration in the sensing X- and Y-axes. The signal output $V_O$ provides both the X- and Y-axes acceleration components. Accordingly, by measuring the sensor output charge $V_O$ at output pad 32, the dual-axis accelerometer 10 provides an indication of acceleration experienced in both the X-axis and the Y-axis.

With particular reference to FIGS. 5–8, the dual-axis accelerometer 10 includes substrate 60 which serves as the underlying support structure. Substrate 60 may include a silicon or silicon-based substrate having the thick oxide insulation layer 58 formed on the top surface, and a bottom oxide insulation layer 56 formed on the bottom surface. The substrate 60 may include silicon, or alternate materials such as glass or stainless steel. The substrate 60 and thick oxide insulation layer 58 are configured to provide the cavity 62 below the inertial mass 12. Additionally, substrate 60 and oxide layer 58 form a pedestal 64 below each of the four rigid supports 16A–16D for purposes of fixing the supports 16A–16D in place relative to the substrate 60.

Initially formed above the substrate 60 and on top of insulation layer 58 is an EPI layer made of conductive material, such as silicon. The EPI layer is made of a conductive material and is etched during manufacture of the accelerometer 10 to form various components including the inertial mass 12, central member 50, rigid support members 16A–16D, support arms 18A–18D, and the isolation trenches 34, 36, 38, 42, and 52. Isolation trenches 34, 36, 38, 42, and 52 provide physical and electrical isolation between adjacent elements. The EPI layer may include a thickness in the range of three to two hundred micrometers, and more particularly of approximately thirty micrometers, according to one embodiment. The EPI layer further may include a field passivation layer disposed on the top surface thereof. The conductive signal paths of electrodes 20A–20D, lines 22A–22D, and sense output line 30 may be formed on top of the conductive EPI layer and partially on top of the dielectric field passivation layer 58 to provide signal transmission paths. In addition, a metal passivating layer may be formed over each of the input and output signal paths 22A–22D and 30.

Figure 6:
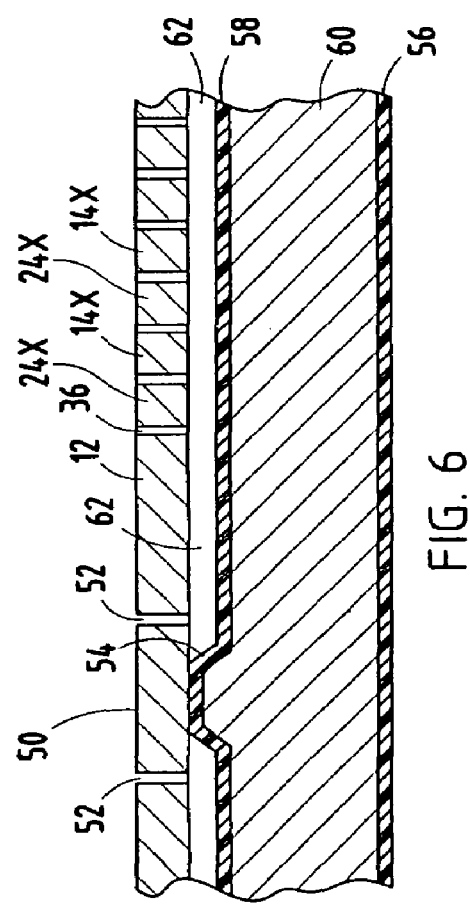
FIG. 6 is a cross-sectional view of the dual-axis accelerometer taken through lines VI—VI of FIG. 3.
Figure 7:
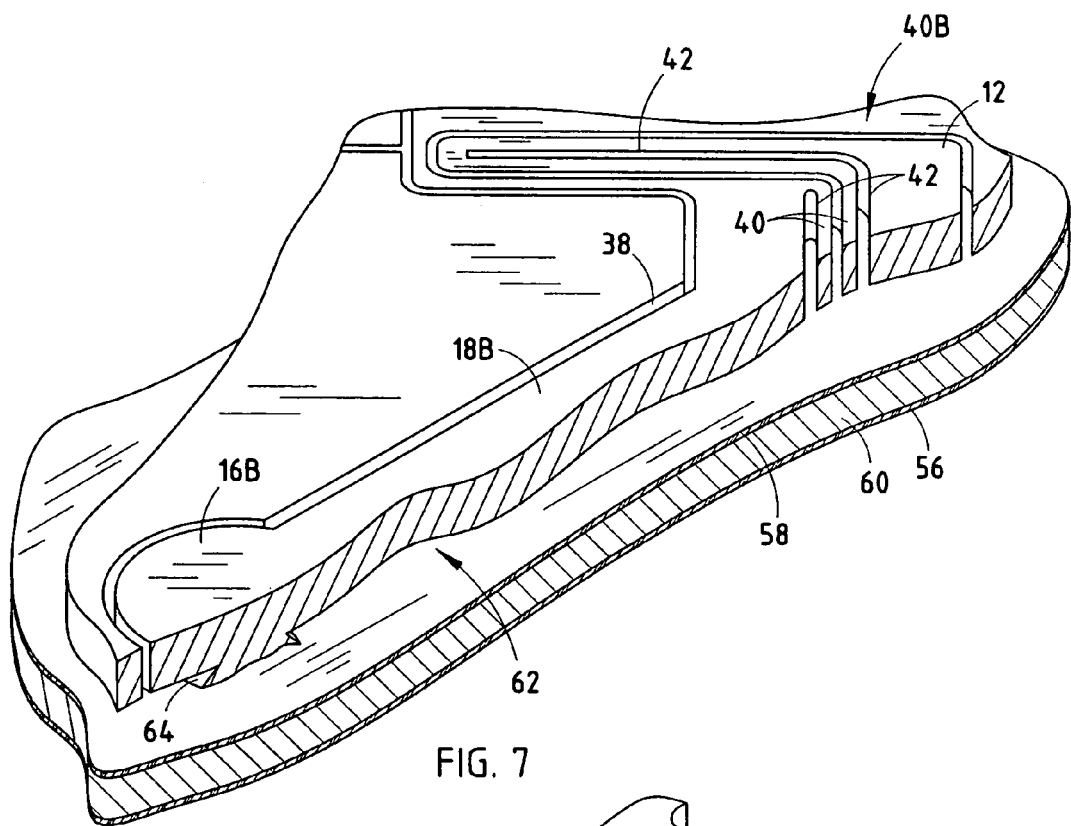
FIG. 7 is an enlarged sectional view of one of the support arms and the corresponding folded spring tether.
Figure 8:
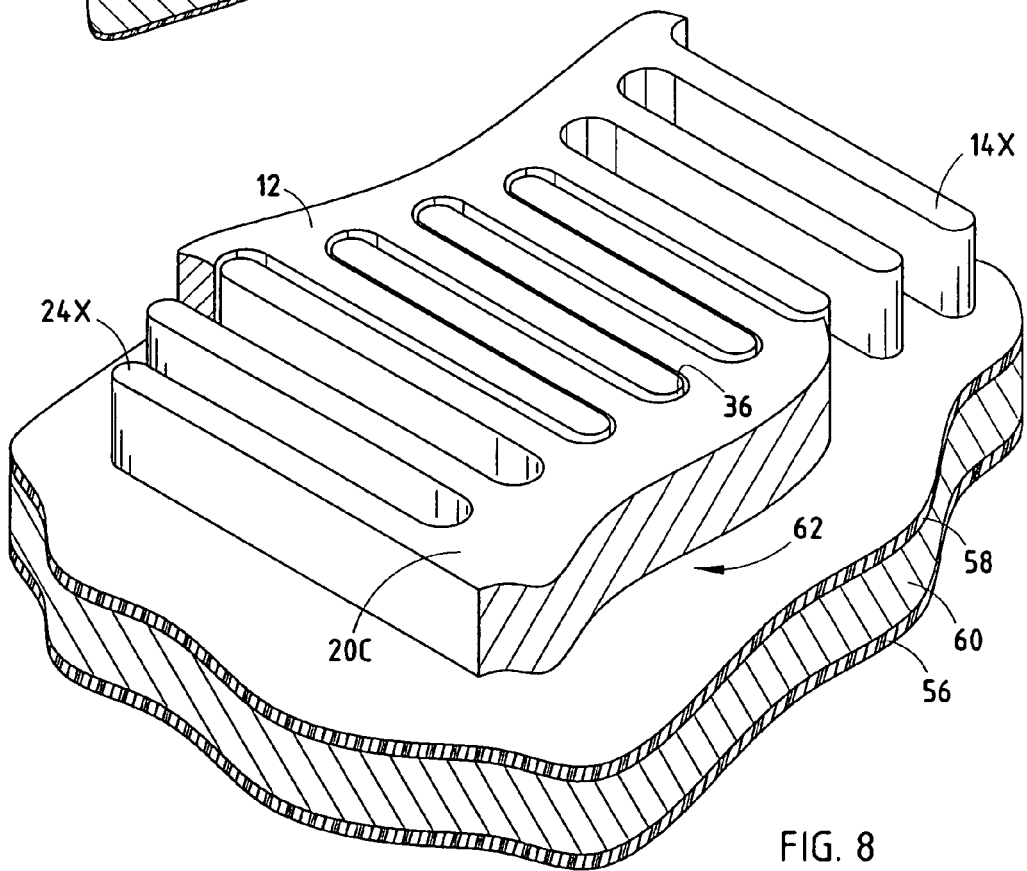
FIG. 8 is an enlarged sectional view of the fixed and movable capacitive plates.

An optional central member 50 and underlying support pedestal 54 may be formed in the center of the inertial mass 12, as shown in FIGS. 2 and 6 to provide structural support during the fabrication process. Prior to the etching process, the central pedestal 54 provides structural support for the EPI layer to allow the inertial mass 12 to be fixedly provided on top thereof. By providing a supporting central pedestal 54, the structural integrity of the accelerometer 10 is maintained during manufacture by minimizing exposure to stress during the fabrication process. After supporting the EPI layer in the central region during the manufacturing process, the central member 50 is isolated from the inertial mass by etching the surrounding isolation trench 52.

Figure 4:
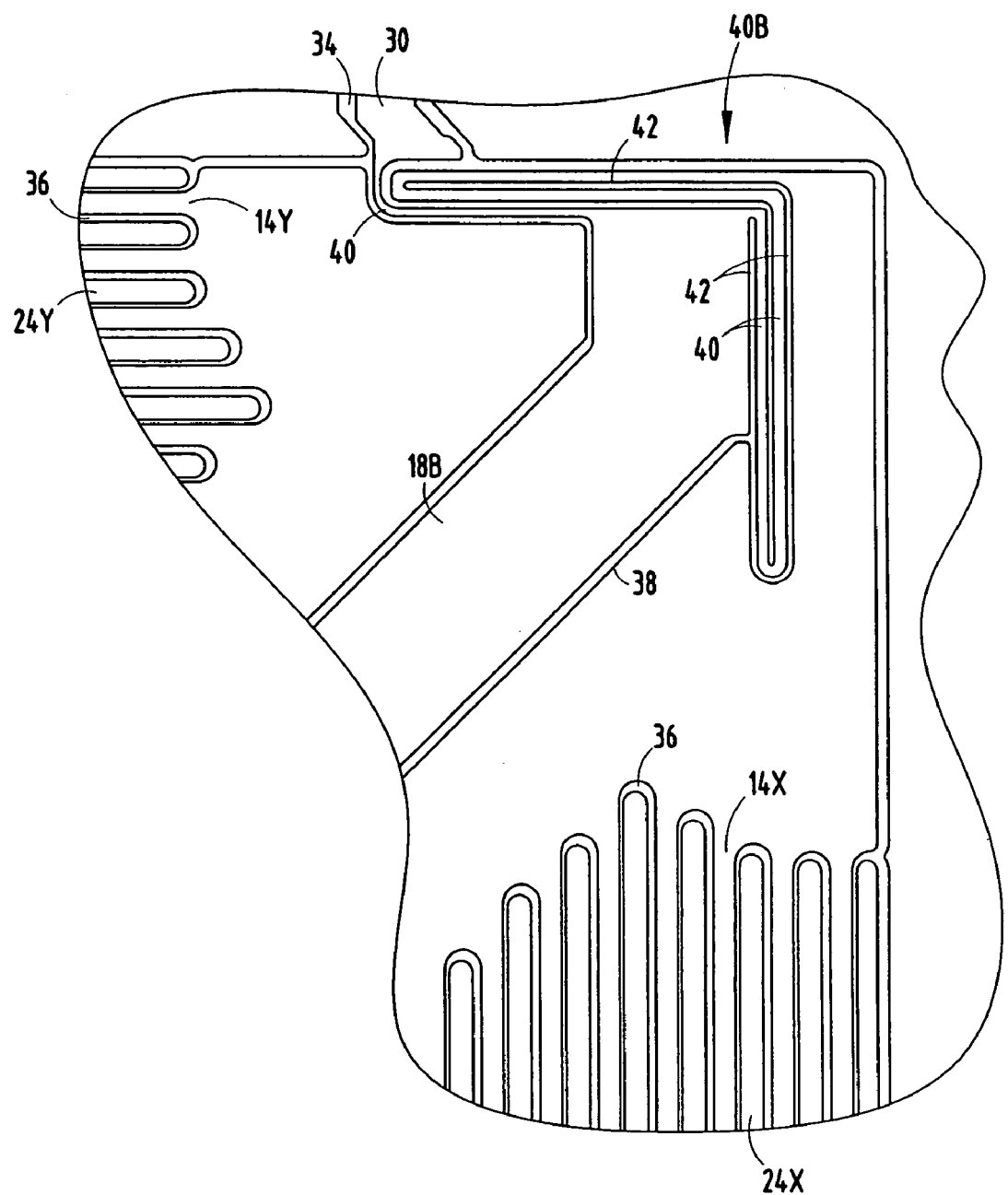
FIG. 4 is an enlarged view of section IV taken from FIG. 3.
Figure 5:
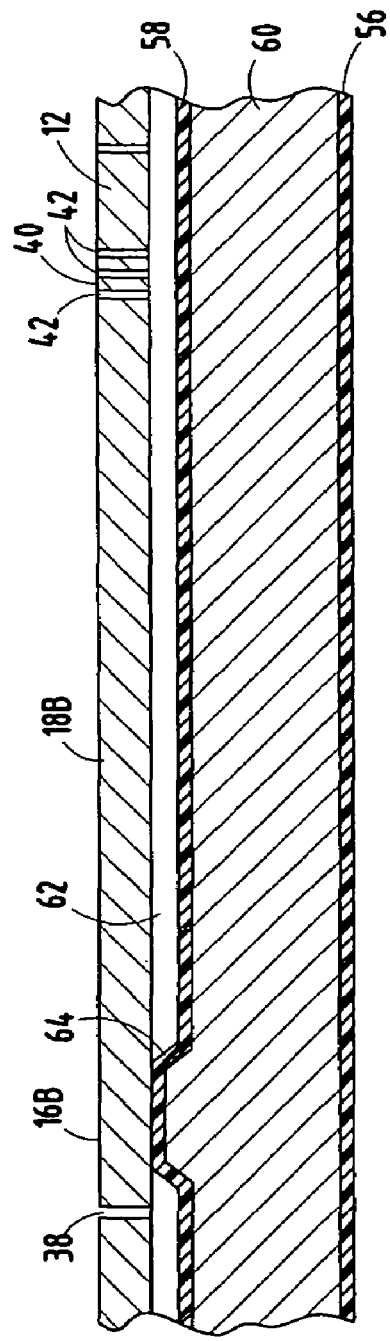
FIG. 5 is a cross-sectional view of the dual-axis accelerometer taken through lines V—V of FIG. 3.

Referring to FIG. 4, the air gap between the capacitive plates 14X and 24X and the air gap between capacitive plates 14Y and 24Y is greater on one side of each capacitive plate as compared to the opposite side. For example, the width of an air gap between the capacitive plates may be approximately twice the width on one side as compared to the opposing side. Additionally, end limit stop members (e.g., beads) can be formed on the plates to limit relative movement between capacitive plates 14X and 24X and between capacitive plates 14Y and 24Y, in the event excessive acceleration is experienced.

The first embodiment of the dual-axis accelerometer 10 shown in FIG. 1 is configured in a one-quarter symmetry such that the rigid support arms 18A–18D and corresponding folded spring tethers 40A–40D are symmetric with respect to each quadrant of the accelerometer 10. Accordingly, each quadrant of the accelerometer 10 appears as a substantial mirror image of the adjacent quadrants but rotated ninety degrees (90°). The second embodiment of the dual-axis accelerometer 10 shown in FIG. 2 has a one-half symmetry in that the rigid support arms 18A–18D and corresponding folded spring tethers 40A–40D, as well as the fixed and movable capacitive plates are generally symmetric about both horizontal and vertical lines extending through the X- and Y-axes through the center of the accelerometer 10.

In both embodiments, the dual-axis accelerometer 10 shown and described herein has four banks of variable capacitors formed by fixed capacitive plates 24X and 24Y and movable capacitive plates 14X and 14Y. The arrangement of the capacitive plates 14X and 24X associated with the first quadrant is a mirror image of capacitive plates 14X and 24X associated with the third quadrant. Likewise, the arrangement of the capacitive plates 14Y and 24Y associated with the second quadrant is a mirror image of the capacitive plates 14Y and 24Y associated with the fourth quadrant.

The four clocked input signals CLK, CLK90, CLKB, and CLKB90 are sequentially out of phase by ninety degrees (90°) such that CLK90 is out of phase by ninety degrees (90°) with respect to CLK, CLKB is one hundred eighty degrees (180°) out of phase, and CLKB90 is two hundred seventy degrees (270°) out of phase. By applying clocked input signals CLK and CLKB out of phase by one hundred eighty degrees (180°) to the first and third fixed electrodes 20A and 20C and likewise applying clocked input signals CLK90 and CLKB90 out of phase with respect to each other by one hundred eighty degrees (180°) to the second and fourth fixed electrodes 20B and 20D, a positive-to-negative orientation is achieved with respect to the opposing capacitive plates. That is, the positive-to-negative orientation between capacitive plates 14X and 24X for the first and third fixed electrodes 20A and 20C are arranged oppositely, and the positive-to-negative orientation between capacitive plates 14Y and 24Y for the second and third fixed electrodes 20C and 20D are arranged oppositely. By alternating the orientation of the plurality of four banks of capacitors in four quadrants, the accelerometer 10 essentially nulls out rotational cross-axes sensitivities and linear off-axes sensitivities and further allows for acceleration to be sensed in both the X- and Y-axes.

Signal Processing

The sensed output charge signal $V_O$ generated at output pad 32 of the dual-axis accelerometer 10 is processed with processing circuitry to extract the components of acceleration sensed in each of the first and second sensing axes. The processing circuitry includes an input for receiving a sensed charge signal generated by a multiple-axis microsensor, a charge-to-voltage converter for converting the sensed charge signal to a voltage signal, a first demodulator for demodulating the voltage signal to generate a first signal indicative of a sensed parameter (acceleration) in a first sensing axis, a second demodulator for demodulating the voltage signal to generate a second signal indicative of a sensed parameter (acceleration) in a second sensing axis, and an output for providing the first and second signals.

Figure 9:
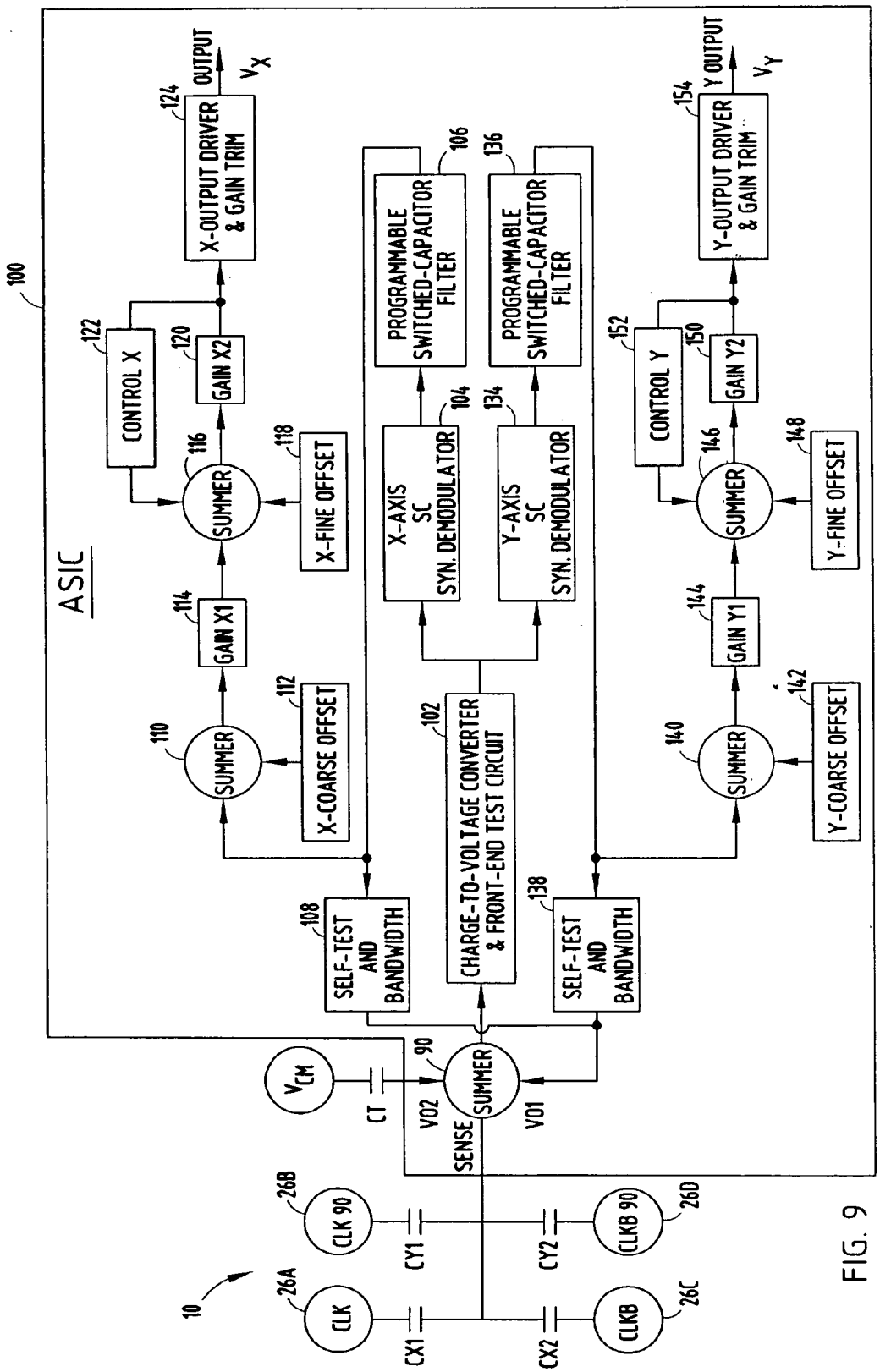
FIG. 9 is a block/circuit diagram illustrating a signal processing circuit coupled to the dual-axis accelerometer for processing the sensed output signal.

The processing circuitry 100 and its method of processing are generally shown in FIGS. 9–13. Referring to FIG. 9, the processing circuitry 100 for processing the sensed signal $V_O$ generated by the dual-axis accelerometer 10 is illustrated according to one embodiment. The fixed electrodes 20A–20D are generally shown receiving the clocked signals CLK, CLK90, CLKB, and CLKB90 at corresponding inputs 26A–26D. The clocked signals are sequentially ninety degrees (90°) out of phase with respect to each other. The clocked signals may include rectangular (e.g., square) wave generated signals each having a clocked frequency ω and alternating voltage levels of $V_S$ and zero volts or plus $V_S$ and minus $V_S$. The resulting capacitors are shown represented by capacitors CX1 and CX2 which are sensitive to acceleration sensed in the X-axis and capacitors CY1 and CY2 which are sensitive to acceleration sensed in the Y-axis. The output of the signal charge from the capacitors CX1, CX2, CY1, and CY2 are summed to form the sensed output which is indicative of the total sensed acceleration.

The processing circuitry 100 is shown as an application specific integrated circuit (ASIC) which may be implemented in analog and/or digital circuitry. The processing circuitry 100 includes a summer 90 for receiving the sensed output $V_O$ on output pad 32 of accelerometer 10. Summer 90 also receives a voltage $V_{O2}$ received from a summation of the capacitors, represented herein as CT, when a common mode voltage source $V_{CM}$ is applied thereto. Voltage $V_{O2}$ contains noise present in the sensed signal. Summer 30 subtracts the voltage $V_{O2}$ containing the noise from the sensed output charge $V_O$. The output of the summer 90 is then processed to extract the X-axis and Y-axis components of sensed acceleration.

The processing circuitry 100 includes a charge-to-voltage converter and front-end test circuit 102 for converting the output of summer 90 to a voltage signal. Additionally, circuit 102 provides test circuitry for testing the accelerometer 10.

The converted voltage generated by circuit 102 is applied to both an X-axis switched capacitor (SC) synchronous demodulator 104 and a Y-axis switched capacitor (SC) synchronous demodulator 134. The X-axis demodulator 104 is a quadrature modulator that separates and extracts the X-axis component of the acceleration signal. This is achieved by multiplying the sensed signal by cos(ωt), where ω is the frequency of the clocked input signal for signal inputs CLK, CLK90, CLKB, and CLKB90. The Y-axis synchronous demodulator 134 separates and extracts the Y-axis acceleration component of the acceleration signal. This is achieved by multiplying the sensed signal by sin(ωt), where ω is the frequency of the clocked input signal for signal inputs CLK, CLK90, CLKB, and CLKB90.

The output of the X-axis synchronous demodulator 104 is filtered by a programmable switched capacitor filter 106. Similarly, the output of the Y-axis synchronous demodulator 134 is filtered by a programmable switched capacitor filter 136. The programmable switch capacitor filters 106 and 132 process the outputs of the X-axis and Y-axis demodulators 104 and 134 to remove noise.

The modulated and filtered X-axis acceleration component output from filter 106 is fed back as an input to summer 90 as part of voltage $V_{O1}$ to be summed with the sense signal, thereby providing a first feedback loop. The first feedback loop passes through a self-test and bandwidth block 108. The self-test and bandwidth block 108 provides a bi-directional sensor self-test function and the frequency response setting (e.g., 400 hertz or 1,500 hertz) for the X-axis. The first feedback loop prevents overloads and minimizes signal distortion due to high frequency signal components, and also facilitates signal path testing.

Summer 110 sums the X-axis acceleration component with an X-coarse offset 112. During sensor calibration, any undesired offset of the demodulator output signal is removed by the coarse offset block 112. The output signal of summer 110 is then amplified by gain stage (gain X1) 114. The amplified signal is input to a summer 116 along with an X-fine offset 118 and feedback control X 122. Summer 116 generates an output to a second gain stage, gain X2 120, the output of which is fed back through control X block 122. The output of gain 120 is provided to an X-output driver and gain trim in block 124. The X-output driver in gain trim block 124 provides an output signal $V_X$ which contains the acceleration along the X-axis.

According to one example, the output driver and gain trim block 124 provides a one milliamp output current drive capability and is used to calibrate the desired sensing range of the microsensor to within a desired accuracy (e.g., one percent). It should be appreciated that the integrated circuitry may be calibrated to provide a sensing range as desired between plus or minus one g (±1 g) and plus or minus 60 g (±60 g), according to one example. The offset and gain trims are performed during the testing of the microsensor during or following manufacture.

The modulated and filtered output of the programmable switched capacitor filter (136) containing the Y-axis component of acceleration is fed back to summer 90 as part of the feedback signal $V_{O1}$ via a feedback loop includes the self-test and bandwidth block 138. Feedback signal $V_{O1}$ therefore includes signals from both the X-axis and Y-axis feedback loops. Feedback signal $V_{O1}$ is summed with the sensed output signal to provide improved linearity under large signal conditions and to facilitate signal path testing. The self-test and bandwidth block 138 provides a bi-directional sensor self-test function and the frequency response setting (e.g., 400 hertz or 1,500 hertz) for the Y-axis of the microsensor.

The modulated and filtered output signal is also applied as an input to summer 140. Summer 140 performs a mathematical summation of the Y-axis acceleration component with a Y-coarse offset 142. During sensor calibration, any undesired offset in the demodulator output signal is removed by the coarse offset block 142. The output signal of summer 140 is then amplified by gain stage (gain Y1) 144. The amplified signal is then input to a summer 146 along with a Y-fine offset 148 and feedback control Y 152. Summer 146 generates an output signal to a second gain stage (gain Y2) J50, the output of which is fed back through control Y 152. The output of gain stage 150 is provided to a Y-output driver and gain trim block 154. The output driver and gain trim block 154 generates an output signal $V_Y$ indicative of the component of acceleration along the Y-axis.

According to one example, the output driver and gain trim block 154 provides a one milliamp output current drive capability and is used to calibrate the desired sensing range of the microsensor to within a desired accuracy (e.g., one percent). It should be appreciated that the integrated circuit may be calibrated to provide a sensing range as desired between plus or minus one g (±1 g) and plus or minus sixty g (±60 g), according to one example. The offset and gain trims are performed during the testing of the microsensor during or following manufacture.

Figure 10:
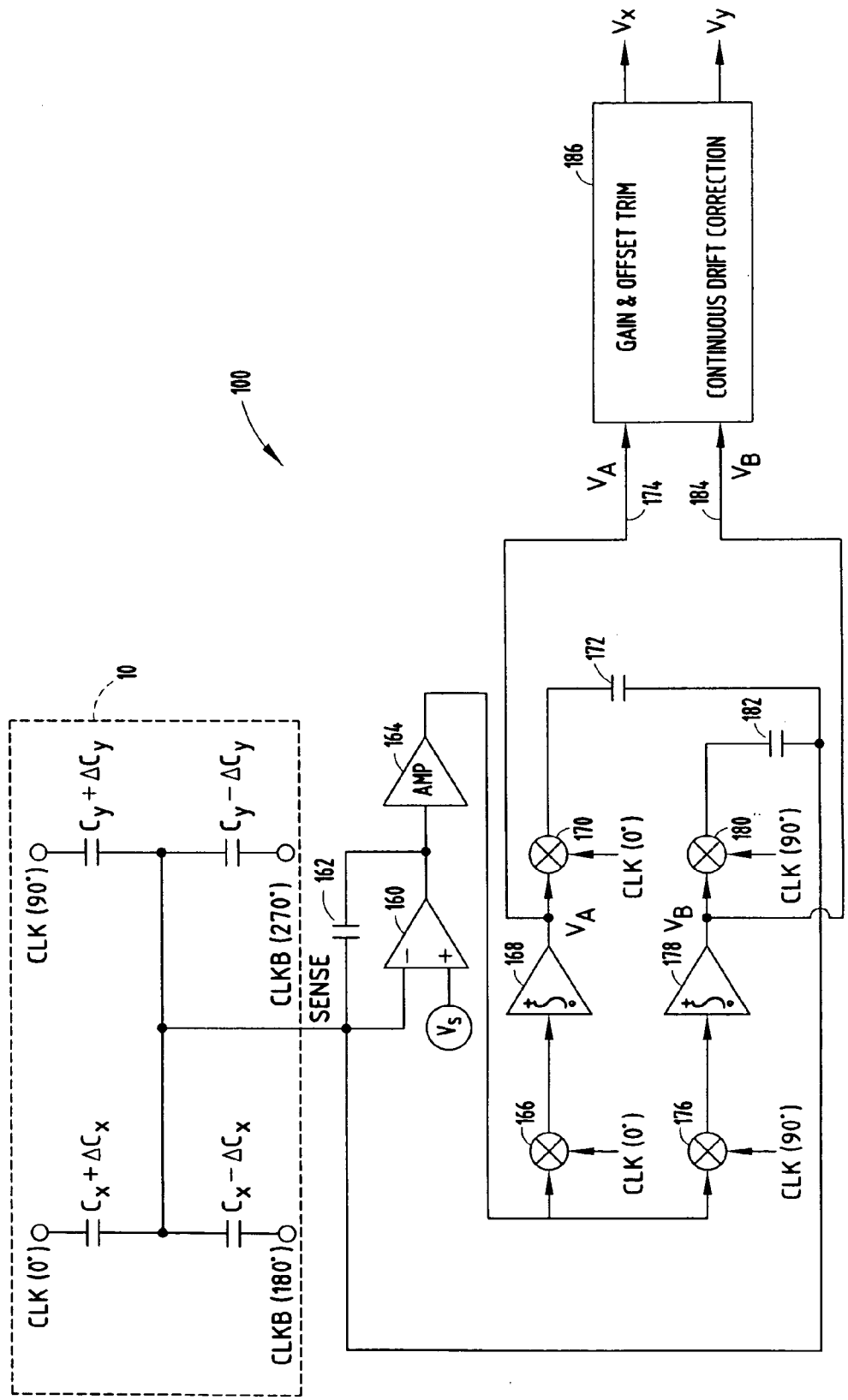
FIG. 10 is a circuit diagram illustrating the signal processing of the dual-axis accelerometer output with analog circuitry.

The processing circuit 100 may be implemented in analog and/or digital circuitry. One example of an analog processing circuit implementation is illustrated in FIG. 10. The analog processing circuit 100 includes a summing amplifier 160, an amplifier 164, and a capacitor 162, which together operate to convert the accelerometer generated sense charge output to a voltage signal. The voltage signal is then input to multipliers 166 and 176. Multiplier 166 multiplies the voltage signal with the clock CLK (zero degrees (0°) signal which operates as a demodulator to demodulate the voltage signal and extract the X-axis component of acceleration. Similarly, multiplier 176 multiplies the voltage signal by clock CLK (ninety degrees (90°)) signal which operates as a demodulator to demodulate the voltage signal to extract the Y-axis component of acceleration.

The demodulated output signal from multiplier 166 is input to an integrator 168 which provides a long term average and essentially filters the signal. The output of integrator 168 shown as voltage $V_A$ provides a voltage signal indicative of the acceleration sensed in the X-axis. Additionally, voltage $V_A$ is multiplied by clocked signal CLK in multiplier 170 to generate voltage $V_X$ which is applied to a capacitor 172 and fed back to the input to the processing circuitry 100 via a feedback path. The feedback signal is thereby summed with the accelerometer generated sense output signal.

The demodulated output signal from multiplier 176 is input to integrator 178 which provides a long term average voltage $V_B$ and essentially filters the signal which is indicative of the acceleration sensed in the Y-axis. The voltage $V_B$ is also multiplied by the clocked signal CLK90, which is ninety degrees (90°) out of phase with signal CLK, via multiplier 180. The output from multiplier 180 is applied to capacitor 182 and fed back to the input to the processing circuit 100 via a feedback loop. The fed back signal is thereby summed with the accelerometer generated sense output signal.

Figure 11:
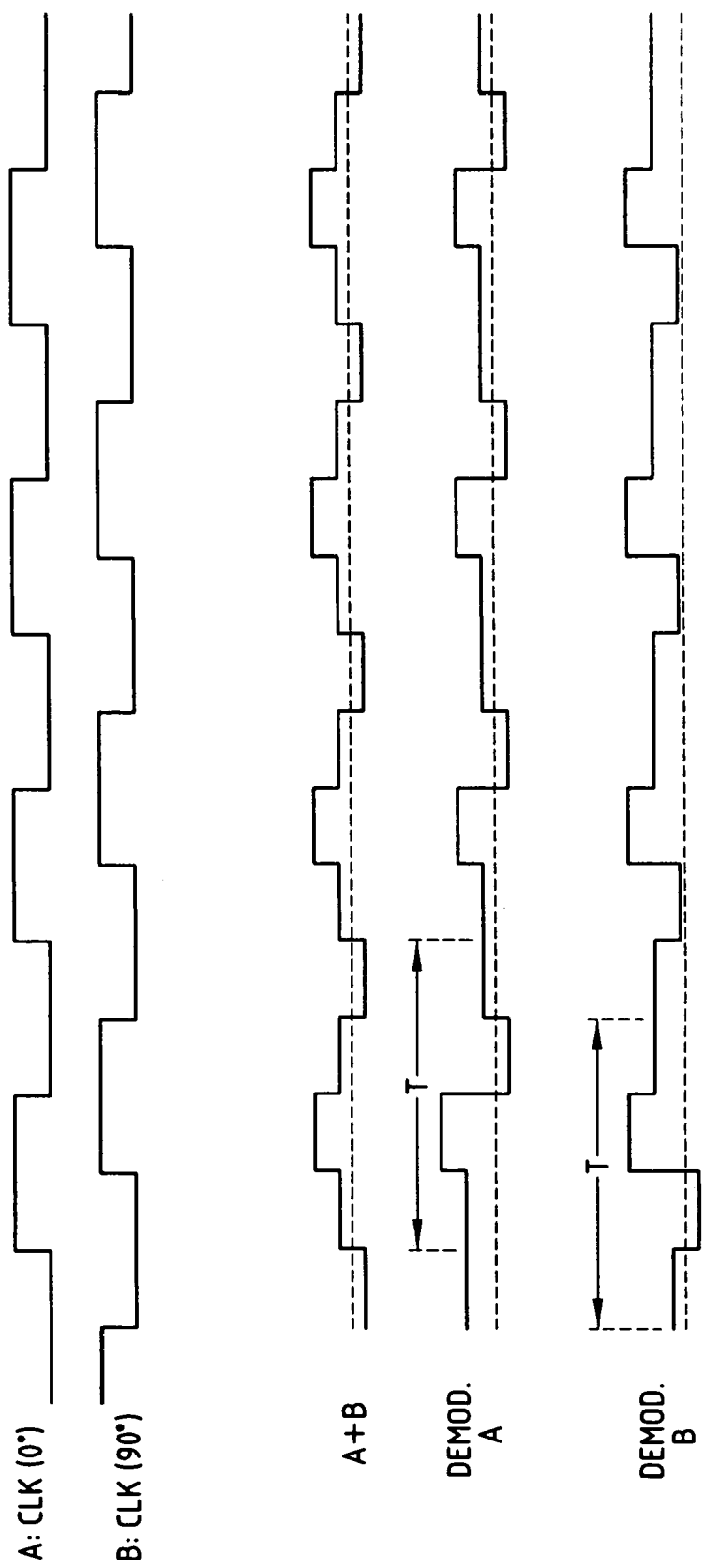
FIG. 11 is a timing diagram illustrating application of clocked input signals to the accelerometer and the signal processing circuit.

The clocked input signal CLK and CLK90 applied to the accelerometer 10 and processing circuit 100 are illustrated in FIG. 11 according to a square-wave clock signal embodiment. Clock signal CLK (90°) is ninety degrees (90°) out of phase with clock CLK (0°). By multiplying the accelerometer generated sense output signal by the clocked signals CLK and CLKB provided to the variable capacitors for sensing the X-axis component of acceleration, the X-axis component of acceleration can be extracted. Similarly, by multiplying the clocked signals CLK90 and CLKB90 applied to the Y-axis variable capacitors, the Y-axis component of acceleration can be extracted. Also shown are the summation of the clocked signals CLK (0°) and CLK (90°) and the resulting demodulated signals which show that the summation of clocked signals CLK and CLK90 can be separated into individual signals containing acceleration information.

The voltages $V_A$ and $V_B$ are indicative of acceleration sensed in the X- and Y-sensing axes, respectively. Voltages $V_A$ and $V_B$ are further applied as inputs to gain and offset trim circuitry and continuous drift correction circuitry in block 186. Block 186 may include conventional gain, offset and drift correction circuitry. Following compensation of gain, offset, and drift correction, processing circuit 100 outputs the X-axis component of acceleration $V_X$ and the Y-axis component of acceleration $V_Y$.

Figure 12:
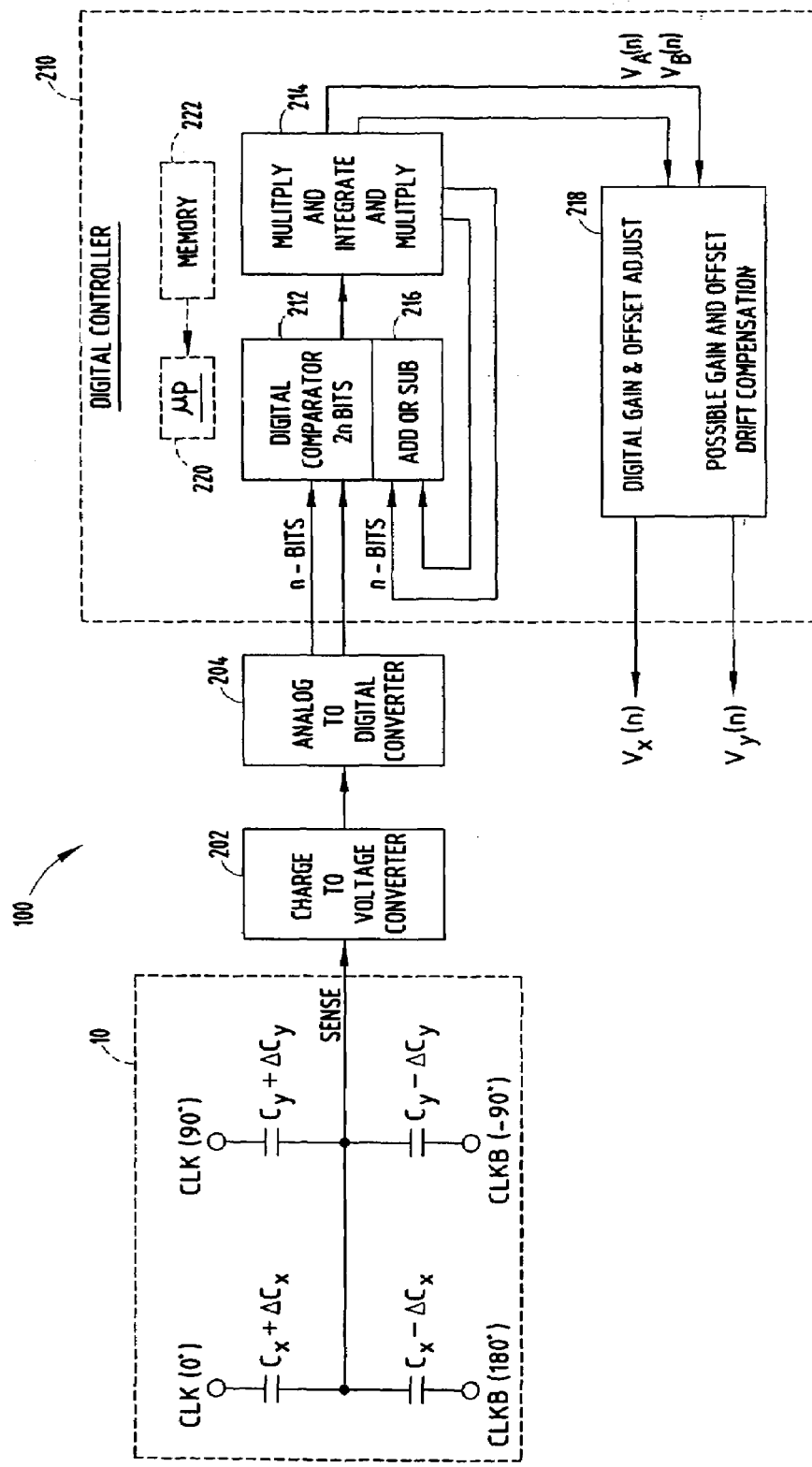
FIG. 12 is a block diagram illustrating the processing of the dual-axis accelerometer output with digital circuitry.

Referring to FIG. 12, the processing circuit 100 is illustrated in digital circuitry according to another embodiment. The digital processing circuit 100 includes a charge-to-voltage converter 202 receiving the accelerometer generated sense output signal. Additionally, an analog-to-digital converter 204 converts the analog voltage signal to a digital voltage signal having n-bits of digital data. The n-bits are input to a digital controller 210. Digital controller 210 includes a microprocessor 220 and memory 222, preferably including non-volatile memory. The digital controller 210 provides a digital comparator 212 and an adder and/or subtractor 216. Additionally, the digital controller 210 provides functions of multiplication/integration/multiplication in block 214. The digital controller 210 further provides digital gain and offset adjustment and possible gain and offset drift compensation in block 218. The outputs of the compensation block 218 provide the component of acceleration in the X-axis as voltage $V_X(n)$ and the component of acceleration in the Y-axis as voltage $V_Y(n)$.

Figure 13:
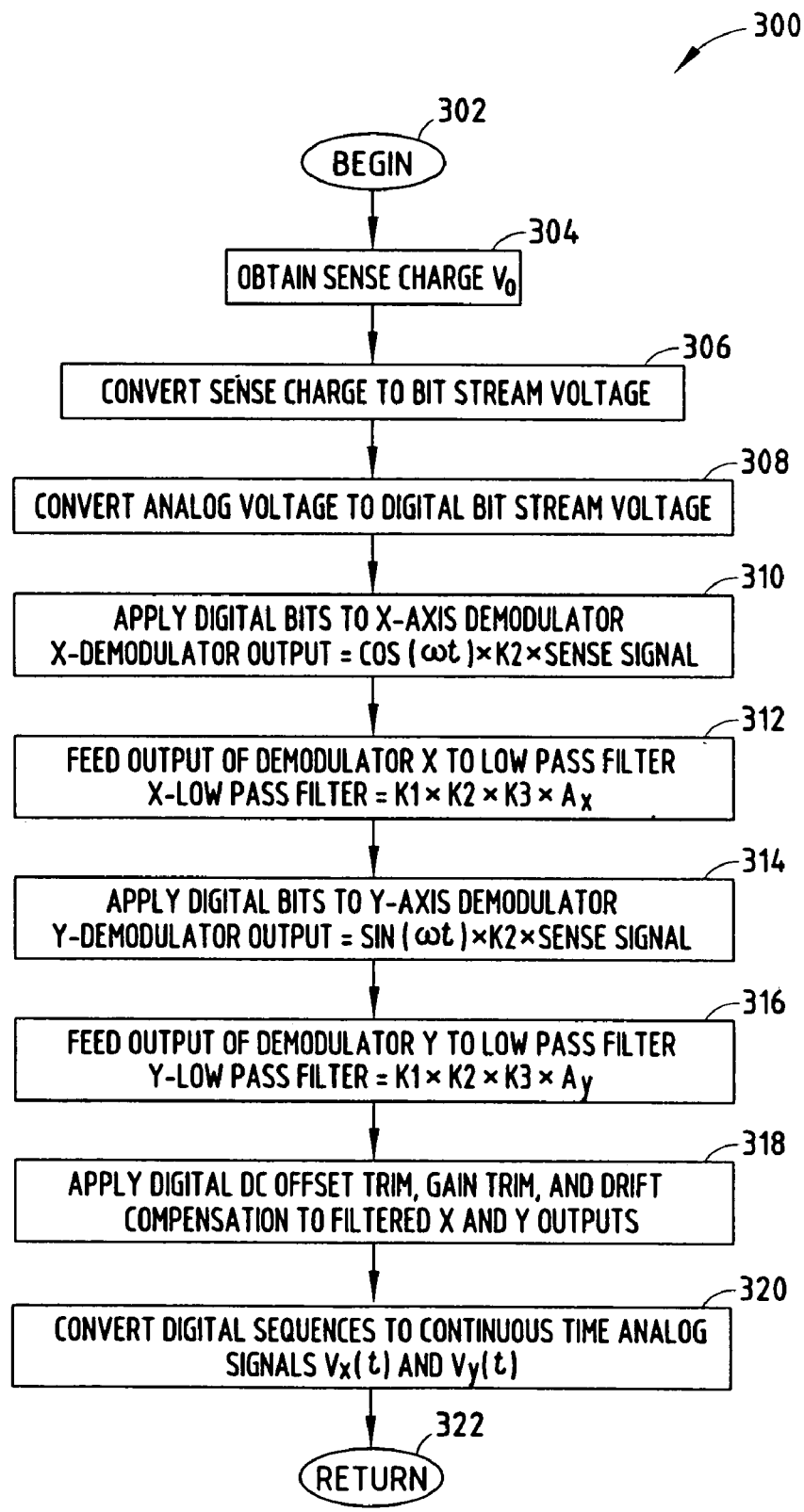
FIG. 13 is a flow diagram illustrating a method of processing the dual-axis accelerometer output with the digital circuitry of FIG. 12.

The digital controller 210 includes one or more software routines for processing the microsensor generated data and extracting the sensed parameters (e.g., accelerations). Referring to FIG. 13, one example of a routine 300 is illustrated for processing the output of a dual-axis accelerometer according to the present invention. Routine 300 begins at step 302 and proceeds to step 304 to obtain the accelerometer generated sense output charge signal $V_O$. Next, in step 306, routine 300 converts the sensed charge signal to an analog voltage signal. In step 308, the analog voltage is converted to a digital bit stream voltage having n bits.

Method 300 proceeds to step 310 to apply the digital bits to the X-axis demodulator. This may be achieved by performing the following equation: X-demodulator output=$\cos(\omega t) \times K2 \times$ sensed signal, where $\omega$ is the frequency of the clock input signals and K2 is gain of the demodulator. The accelerometer generated sense output signal can be represented by the following equation. Sensed signal=$A_X \times K1 \times \cos(\omega t) + A_Y \times K1 \times \sin(\omega t)$, where K1 is a constant factor and $A_X$ and $A_Y$ are the acceleration in the X-axis and Y-axis directions, respectively.

In step 312, method 300 feeds the output of demodulator X to a low-pass filter. The low pass filter may perform the following filtering function: filter output=$K1 \times K2 \times K3 \times A_X$, where K1 is a constant factor, K2 is gain of the demodulator, K3 is the gain of the filter, and $A_X$ is the X-axis acceleration.

Proceeding to step 314, method 300 applies the digital bits to the Y-axis demodulator. This may be performed by the following equation: Y-demodulator output=$\sin(\omega t) \times K2 \times$ sensed signal. The output of the demodulator Y is then fed to a low-pass filter in step 316. The Y-low pass filter may be implemented by the following equation: filter output=$K1 \times K2 \times K3 \times A_Y$, wherein $A_Y$ is the Y-axis acceleration. Accordingly, the method 300 processes and extracts the X-axis component of acceleration by multiplying the acceleration by $\cos(\omega t)$, and further extracts the Y-axis component of acceleration by multiplying the sensed acceleration by $\sin(\omega t)$.

Method 300 proceeds to step 318 to apply the digital DC offset trim, gain trim, and drift compensation to the filtered X and Y outputs in step 318. The digital sequence of outputs X and Y are converted to continuous time analog signals $V_X(t)$ and $V_Y(t)$ in step 320. Method 300 then returns in step 322.

The processing circuit 100 may be used to process any of a number of signals generated with sensors to extract parameters of the sensed signal pertaining to first and second sensing axes. This may include, processing sensed signals generated with other accelerometers or with other types of sensors such as rate sensors. While examples of analog and digital circuitry are illustrated herein for processing the dual-axis accelerometer 10, according to first and second embodiments, it should be appreciated that other circuit configurations and software routines may be employed, without departing from the spirit of the present invention. It should be further appreciated that combinations of analog and digital circuits may be employed to implement the signal processing of the dual-axis accelerometer output signal.

The dual-axis accelerometer 10 and processing circuit 100 are useful for a wide variety of current and future applications. For example, the dual-axis accelerometer 10 may be employed to sense acceleration in a vehicle for use with safety devices such as front and side air bag systems, and to control vehicle stability. The dual-axis accelerator 10 and processing circuit 100 could also be employed in the appliance industry to control vibration in appliances. Dual-axis sensors could also be applied in a consumer electronics and gain markets as a user interface to a computer or a personal digital assistant (PDA) where a cursor control may be accomplished by manipulating the wrist of the user. Industrial and robotics equipment can also use the dual-axis accelerometer 10 for active control to maximize placement accuracy and to minimize operation cycle time. Further, the dual-axis accelerometer 10 may provide tilt detection and control, given greater levels of heavy equipment operator safety. The dual-axis accelerometer 10 and processing circuitry 100 may be employed for these and other applications.

It should further be appreciated that the dual-axis accelerometer 10 may be manufactured and tested according to any of a number of known techniques for manufacturing and testing MEMS microsensors. The testing may include die-level testing of the sensor and the signal processing integrated circuitry used to perform calibration of the sensor module and to ensure the sensor meets the performance requirements. Die-level testing of the accelerometer 10 may be achieved as disclosed in U.S. Pat. No. 6,918,282, entitled "SELF-TEST CIRCUIT AND METHOD FOR TESTING A MICROSENSOR," the entire disclosure of which is hereby incorporated herein by reference.

The dual-axis accelerometer 10 shown and described herein receives four clocked input signals via input lines 26A–26D and generates a sensed output charge signal at output pad 32. However, it should be appreciated that the accelerometer 10 could alternately be configured to apply the input signals to the output pad 30 via additional circuitry (e.g., summing circuitry) and to sense an output signal via input pads 26A–26D. These and other variations of the dual-axis accelerometer 10 and sensor processing circuitry 100 may be implemented, without departing from the teachings of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A signal processing circuit for processing signals generated by a multiple-axis sensor comprising:
    an input for receiving a sensor signal generated by a multiple-axis sensor;
    a first demodulator for demodulating the sensor signal to generate a first signal indicative of a sensed parameter in a first sensing axis;
    a second demodulator for demodulating the sensor signal to generate a second signal indicative of a sensed parameter in a second sensing axis; and
    an output for providing the first and second signals, wherein the first and second demodulators concurrently demodulate the sensor signal and concurrently generate the first and second signals.

2. The circuit as defined in claim 1, wherein the sensor comprises a capacitive type dual-axis accelerometer.

3. The circuit as defined in claim 1 further comprising a summer, a first feedback loop comprising a first multiplier for generating a first AC signal from the first signal and for further feeding the first AC signal to the summer, and a second feedback loop comprising a second multiplier for generating a second AC signal from the second signal and for feeding the second AC signal to the summer, and wherein the first and second AC signals are summed with the sensor signal.

4. The circuit as defined in claim 1 further comprising a charge-to-voltage converter for converting a charge signal output generated by the sensor to a voltage signal.

5. The circuit as defined in claim 1, wherein the first and second demodulators each comprises a switched capacitor synchronous demodulator.

6. The circuit as defined in claim 1 further comprising a first filter for filtering the voltage signal generated by the first demodulator, and a second filter for filtering the voltage signal generated by the second demodulator.

7. The circuit as defined in claim 1 further comprising offset circuitry for adjusting offset in each of the demodulated signals.

8. The circuit as defined in claim 1 further comprising gain compensation circuitry for adjusting gain of the demodulated signals.

9. The circuit as defined in claim 1, wherein the circuit comprises analog circuitry.

10. The circuit as defined in claim 1, wherein the circuit comprises digital circuitry.

11. The circuit as defined in claim 1, wherein the first sensing axis is substantially orthogonal to the second sensing axis.

12. The circuit as defined in claim 1, wherein the sensor senses a component of acceleration in the first sensing axis and a component of acceleration in the second sensing axis for use on a vehicle.

13. A method of processing a sensor signal generated by a sensor for sensing a parameter pertaining to multiple sensing axes, said method comprising the steps of:
    receiving an sensor signal generated by a sensor;
    demodulating the sensor signal to generate a first signal indicative of a sensed parameter in a first sensing axis;
    demodulating the sensor signal to generate a second signal indicative of a sensed parameter in a second sensing axis; and
    outputting the first and second signals, wherein the steps of demodulating the sensor signal are continuous such that the first and second signals are concurrently generated.

14. The method as defined in claim 13, wherein the step of receiving the sensor signal generated by a sensor comprises receiving an output signal from a capacitive type dual-axis accelerometer.

15. The method as defined in claim 13 further comprising the step of converting a charge output signal generated by the sensor to a voltage signal.

16. The method as defined in claim 13, wherein the steps of modulating the sensor signal comprises multiplying the sensor signal by first and second clocked signals, wherein the first and second clocked signals are out of phase by a predetermined amount.

17. The method as defined in claim 13 further comprising the steps of filtering the first signal and filtering the second signal.

18. The method as defined in claim 13 further comprising the step of adjusting for offset in each of the first and second signals.

19. The method as defined in claim 13 further comprising the step of adjusting gain in each of the first and second signals.

20. The method as defined in claim 13, wherein the first sensing axis is substantially orthogonal to the second sensing axis.

21. The method as defined in claim 13, wherein the parameter comprises acceleration for use on a vehicle.

22. The method as defined in claim 13 further comprising the steps of generating first and second AC signals from the first and second signals and feeding back the first and second AC signals in respective first and second feedback paths and summing the first and second AC signals with the sensor signal.

* * * * *